Dec. 12, 1933.    G. W. PICKARD    1,938,857
ELECTRICAL CONDENSER
Filed Dec. 29, 1922    8 Sheets-Sheet 1

Fig. 1.

Inventor
GREENLEAF WHITTIER PICKARD
By his Attorney
Philip Farnsworth

Dec. 12, 1933.   G. W. PICKARD   1,938,857
ELECTRICAL CONDENSER
Filed Dec. 29, 1922   8 Sheets-Sheet 2

Fig. 2.

Inventor
GREENLEAF WHITTIER PICKARD
By his Attorney
Philip Farnsworth

Dec. 12, 1933.     G. W. PICKARD     1,938,857
ELECTRICAL CONDENSER
Filed Dec. 29, 1922     8 Sheets-Sheet 4

Dec. 12, 1933.  G. W. PICKARD  1,938,857
ELECTRICAL CONDENSER
Filed Dec. 29, 1922   8 Sheets-Sheet 7

INVENTOR
GREENLEAF WHITTIER PICKARD
BY
ATTORNEY

Dec. 12, 1933.    G. W. PICKARD    1,938,857
ELECTRICAL CONDENSER
Filed Dec. 29, 1922    8 Sheets-Sheet 8

INVENTOR
GREENLEAF WHITTIER PICKARD
BY
ATTORNEY

Patented Dec. 12, 1933

1,938,857

UNITED STATES PATENT OFFICE 1,938,857

ELECTRICAL CONDENSER

Greenleaf Whittier Pickard, Newton Center, Mass., assignor, by mesne assignments, to General Electric Company, a corporation of New York Application December 29, 1922
Serial No. 609,552

9 Claims. (Cl. 175—41)

This invention relates to electrical condensers. Condensers are usually built as stacks composed of sheets of foil and dielectric, such as mica or paper. For high potential work, the stack is built up of sections of sheets of foil and dielectric connected in series, the greater the number of sections the less the capacity will be for a given size sheet. Such condensers are unsatisfactory, however, where high potential is necessary with comparatively low capacity. Also such condensers are unatisfactory, and in many cases impracticable for use in high voltage direct current circuits, owing to the difference in leakage across different sections, which soon results in extreme potentials across non-leaky sections, causing their destruction. To build such a condenser of mica is also expensive.

In order to provide a cheap, compact condenser, it is contemplated in the present invention to use sulfur (in a special form) or an equivalent not only as a dielectric between the armature plates but also as an insulating filler between the condenser and its casing. Sulfur, for example, has an extremely high insulation resistance, but heretofore its brittleness and porosity have prevented its use to any extent as an insulating or dielectric material, especially for use in high tension electrical condensers. On the other hand, the advantages of sulfur for electrical use are as follows:—low dielectric loss, high insulation resistance, high dielectric constant, cheapness, good dielectric strength and high melting point (115°–119° C.) and its rigidity and entire absence of cold flow below the melting point.

This application is a continuation in part of my application Serial Number 465,079, filed April 28, 1921, and of my application Serial Number 468,799, filed May 11, 1921.

An object of the invention is to provide a cheap condenser of high efficiency.

Another object is to provide a cheap, efficient, rigid and strong insulator which will contain sulfur as an ingredient or in the production of which sulfur is employed.

Another object of the invention is to so employ and prepare sulfur or its equivalent as a dielectric or insulator as to take full advantage of the extremely low dielectric loss and high insulation resistance of the material and at the same time to ensure such a condition of the material as will avoid the troubles resulting otherwise from the use of a brittle and porous material.

Another object of the invention is to provide a condenser structure in which the plates may be mounted in parallelism and equally spaced.

In the accompanying drawings, I have illustrated one embodiment of my invention in which.

The type of condenser disclosed in Figs. 1 to 5 of the drawings is especially adapted for high potential work for use in radio transmitters, and is designed to have a capacity of .004 mfd. at a working voltage of 18,000 volts maximum or thereabouts, i. e., it is a high potential but low capacity device. The invention, however, is not limited to a condenser of this particular size.

A characteristic of the condenser of the present invention is that the plates of one polarity may be adjusted during the manufacture relative to the casing and plates of the opposite polarity, and the two sets of plates may be independently adjusted whereby the correct location of the plates within the casing in secured and the plates are maintained in parallelism with equal spaces between them. For this purpose, one set of plates is preferably mounted upon the casing, which is preferably of metal and constitutes one terminal of the condenser, while the other set of plates is preferably mounted upon an insulating cover through which projects the opposite or high potential terminal. In the embodiment of the invention herein disclosed, however, after the plates have been properly located relatively to each other and relatively to the casing, they are embedded in a fusible dielectric, preferably the special sulfur or its equivalent of the present invention, which later hardens, holding the plates in position in the solidified mass.

Figure 1:
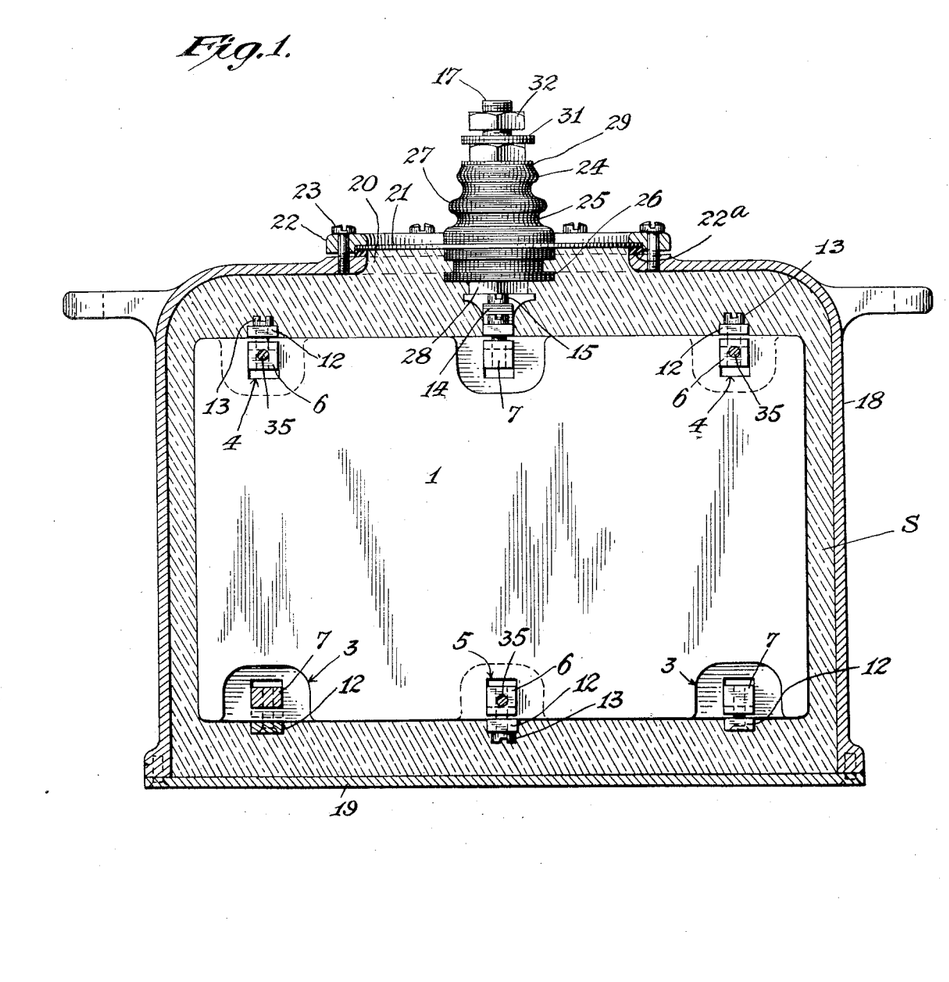
Figure 1 is a sectional elevation of a condenser on the line 1—1 of Fig. 3 looking in the direction of the arrows.
Figure 2:
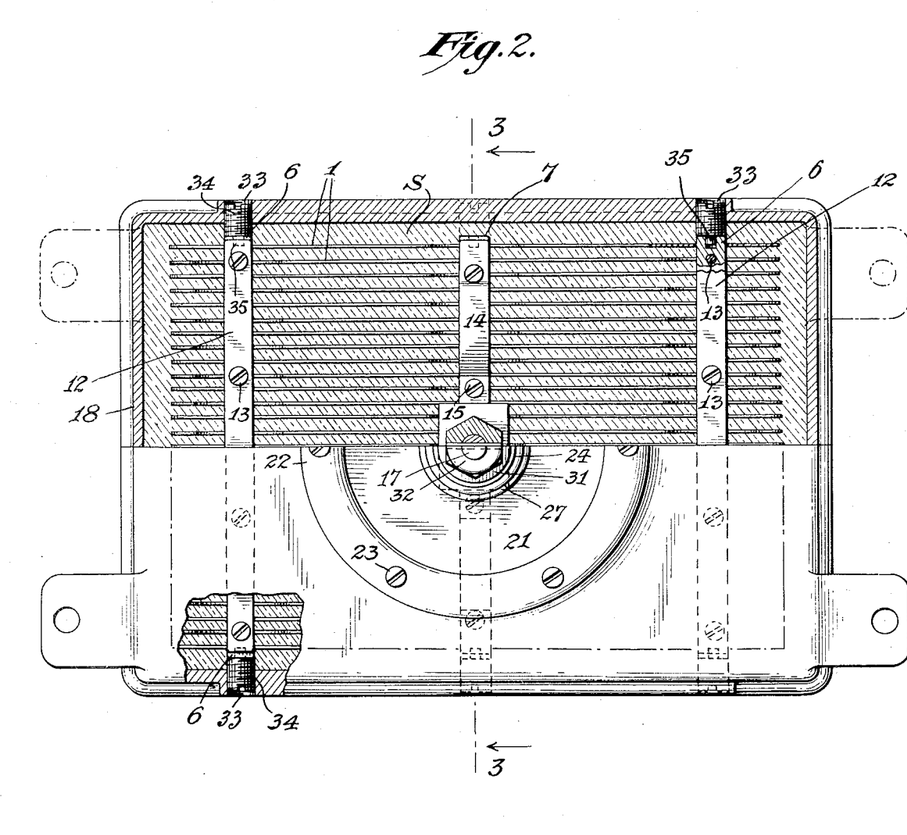
Fig. 2 is a plan view thereof, partly in section.
Figures 3, 4, 5:
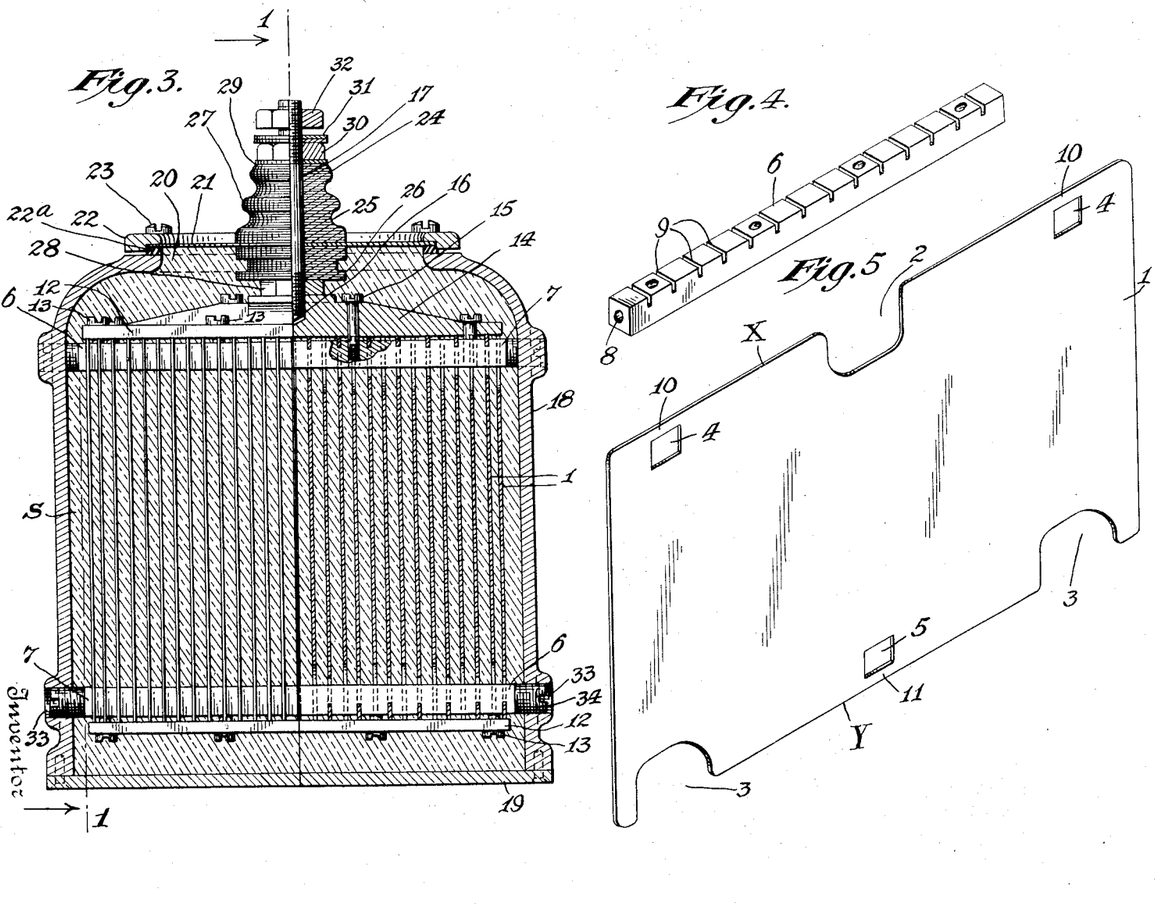
Fig. 3 is a sectional elevation thereof taken on the line 3—3 of Fig. 2 with part of the condenser plates in elevation, and looking in the direction of the arrows.
Fig. 4 is a detail perspective view of a plate-securing member.
Fig. 5 is a perspective view illustrating a condenser armature plate used in the construction.

The condenser of the present invention is characterized by simplicity and uniformity of parts which may be easily assembled whereby the condenser cost is reduced to a minimum. For this purpose, I have provided metal plates 1 (Fig. 5), which are identical in contour for the two sets of plates of opposite polarity. Each plate 1 has upon an edge X a cut-away portion or recess 2 arranged centrally, and upon the opposite edge Y a pair of such recesses 3 arranged respectively near the ends thereof. Upon opposite sides of recess 2 are two openings 4, while intermediate the recesses 3 is a single opening 5, the openings 4 and 5 being spaced inwardly from the edges X and Y respectively. The plates 1 constitute the armatures or condenser plates of opposite polarity, the edges X and Y being reversed in the two sets of plates, as more fully described hereinafter. In Fig. 4, I have shown a metal connecting or cross member 6 for connecting the plates of one polarity together; a similar cross member 7 (Fig. 3) connects the plates of opposite polarity together. The members 6 secure together in spaced relation the plates 1 of the set which is electrically connected to and supported by the casing 18, which may comprise any suitable metal as hereinafter more fully described. The connecting members 6, however, are distinguished from the similar members 7 by being provided with recesses or holes 8 at opposite ends for a purpose hereinafter described. The several connecting members 6 and 7 are each provided with equally-spaced grooves 9 upon one side thereof. As illustrated, there are two members 6 at the upper end of the condenser connecting the plates of one set, and a single intermediate member 6 at the lower end of the condenser (shown in Fig. 1) connecting the plates of the same set. The members 7, on the other hand, connect the plates of the opposite set upon opposite sides of the lower member 6 (Fig. 1) and intermediate the members 6 at the upper portion of the plates (Fig. 1). In the present invention, the plates 1 of one set are inverted with relation to those of the opposite set, and the members 6 and 7 are threaded through the openings 4 and 5 respectively with grooves 9 (Fig. 4) receiving portions 10 and 11 of the plate 1 between the edges X and Y and the respective openings 4 and 5. By inverting the plates (relatively to edges X and Y, Fig. 5) of one polarity relative to the plates of the opposite polarity, when the members 6 and 7 are in place, the recesses 2 and 3 are so arranged that the plates and connecting members of one polarity are insulated or spaced from the plates and connecting members of opposite polarity. The connecting members 6 and 7 are clamped in position securing their armature plates in place by metal bridging or clamping members 12 which extend over the edges of the armature plates (Figs. 1 and 3). Screws 13 are provided which extend through the bridging members 12 into the members 6 and 7 whereby the plates of each polarity are clamped securely together and in place with the grooves 9 (Fig. 4) brought up firmly against the edges 10 and 11 of the respective armature plates. The connecting member 7, however, centrally of the top (Figs. 1 and 2) is provided with a metal bridging member 14 of special design provided at its upper central portion with a threaded opening 16 (Fig. 3) adapted to receive a binding post or terminal 17. The member 14 is secured by screws 15 to the upper central member 7 (Figs. 1 and 2).

The casing 18 in the present instance is provided with a removable bottom 19, and is restricted at its upper end, having an opening 20 therein which is closed by means of an insulating cover 21, preferably of mica, held in place upon the top of the casing 18 by an annular clamping member 22 secured by screws 23 to the casing. Interposed between the edge of the mica cover 21 and the casing 18 is a gasket 22a, preferably of lead, whereby a tight joint is ensured at the top of the casing.

The threaded terminal rod or post 17 projects through the cover 21, which is preferably of one or more sheets of mica. (If of more than one sheet, then pressed together and secured by means of a suitable adhesive such as paraffin or sulfur.) Upon opposite sides of the cover 21 around the terminal 17 is a bushing of insulating material 24. This bushing preferably consists of two parts, one 25 above the cover 21, and the other 26 below the cover 21. The bushing 24 is made up of laminated mica disks or washers. These laminations are built up and secured together by means of suitable adhesive such as paraffin or sulfur, and compressed under heat whereby the two parts 25 and 26 of the bushing are formed into solid masses. After building up the mica disks and impregnating them as above described, the outer surface of the bushing 24 is turned and polished forming corrugations 27 therein as illustrated to increase the creepage distance, the cover 21 and the bushing 24 thoroughly insulating the terminal 17 from the metal casing 18. Such outer surface of the mica bushing is highly polished and has the appearance of a solid bushing. Interposed between the member 14 and the lower bushing 26 is a nut 28 threaded upon the terminal 17, which clamps the lower bushing 26 in place, while above the opposite bushing 25 are the washer 29, nut 30, washers 31 and nut 32, all mounted upon the terminal 17 and with nut 30 threaded thereon to clamp the upper part 25 of bushing 24 against the cover 21 and support the plates of one polarity from cover 21. Nut 32 is adjustable whereby any suitable lead may be secured to the high potential terminal 17.

As above stated, the condenser plates of the other polarity, that is, those clamped to the members 6, are supported from the casing 18, and for this purpose the casing upon opposite sides has spaced threaded openings 33 (Fig. 2), two at the top, and one at the bottom located on a vertical line arranged centrally of the first-mentioned openings. In the threaded openings 33 are adjustably mounted threaded plugs 34 having upon their inner ends projections, plugs or pins 35 (Fig. 1) extending into the openings 8 (Fig. 4) in the ends of member 6, whereby the plates of this polarity are supported from the casing in good electrical contact therewith, the casing constituting the low potential terminal of the condenser.

In assembling the condenser, the plates of one polarity are first secured together and clamped by the members 6 and 12 only, and in like manner the plates of opposite polarity are secured together and clamped at the bottom only by the members 7 and 12. The two sets of plates are then interleaved or intermeshed with each other, and the single upper central connecting member 7 is inserted in place and clamped by member 14, and the single lower central connecting member 6 is inserted in place and clamped by a member 12. The nut 28 is then secured in place upon the terminal rod 17, and above this is placed the lower part 26 of the bushing 24. That assembly is then inserted in the casing 18 through the large bottom opening of the latter, with the terminal 17 extending through the mica cover 21 and secured, the plates of polarity opposite to that of terminal 17 being supported by the threaded plugs 34 from the casing.

By loosening the nut 30, the set of plates supported by the terminal rod 17 may be rotated relative to the other set of plates until the plates of both sets are in parallelism with each other and with the side of the casing. The nut 30 (Fig. 3) is then tightened up, permanently positioning the plates supported by rod 17. Independently of the adjustment of the set of plates supported by the terminal rod 17, the plates of opposite polarity supported by casing 18 may be adjusted by variably manipulating the screw plugs 34 at the top and bottom upon opposite sides, these plugs initially rather loosely engaging members 6 to allow such adjustment. A suitable gauge is inserted temporarily between the opposite plates to obtain the correct or desired spacing between them. The screw plugs 34 are then adjusted to rigidly and tightly maintain the distances between successive plates equal and to secure the set of plates supported thereby to the casing 18. After the condenser plates have been assembled in their casing and secured in parallelism, the plates being spaced equal distances apart, the condenser is ready for the process of inserting the dielectric.

The structure of condenser above described is adapted for use with dielectric S of a fusible or soluble nature which can be poured into the casing and between the plates in a fluid condition, preferably sulfur, as the best dielectric which I have been able to find. The sulfur, however, in the commercial form, is naturally very brittle and also very porous and crumbly. I have devised a method for treating this sulfur and pouring it into the condenser casing whereby a stable, dense, non-porous, holosteric mass of sulfur, free from air and voids, is formed within the condenser and between the armature plates. A difficulty found in the use of commercial sulfur as a dielectric between the armature plates of a condenser, or even for use as an insulator or dielectric in general, is that the sulfur is very brittle, and when it solidifies from a molten state is in more or less unstable condition. This, it is believed, is due to the fact that the sulfur tends to crystallize first in monoclinic form, which later changes to the rhombic form, the change from one to the other form producing stresses within the mass of sulfur which cause cracking and produce an inferior insulation and dielectric. It is the object of the invention, therefore, to so treat commercial sulfur that when it solidifies, it will solidify in a compact, non-porous form in more or less unstrained or untensioned condition, whereby it will be serviceable for a long time.

It has been found that when commercial sulfur solidifies from a molten condition, the mixture of such sulfur before solidification, with some sulfur in rhombic form will cause direct change of the commercial sulfur into the rhombic form without passing through the inferior monoclinic form. One method of preparing commercial sulfur as a dielectric or as an insulator for any purpose such as in condensers is as follows. Commercial sulfur which is comparatively free of acids and which has been strained is heated for approximately two hours at 180° C., the sulfur in this condition having more or less of a gummy or viscous nature. After the sulfur has been heated or cooked as above described, it is allowed to cool to about 130° C., which is above the normal melting and solidifying point of the sulfur, and powdered roll sulfur (the rhombic variety) is then stirred or sifted into the molten liquid. The powdered sulfur is added and the stirring continued until a thermometer in the mixture shows that the temperature of the mixture including the recently-added powdered sulfur is below the normal melting or solidifying point. While in this condition, the sulfur mass is very mushy or has the consistency of thick pea soup. The addition of the powdered sulfur is continued until the sulfur changes color from a dark brown color to a light brown or yellow and reaches a temperature of approximately 110° C. The mixture maintains itself at this temperature for a comparatively long period. While in this condition and at that temperature, the mixture is molded to shape or, as in the present case, poured through the bottom of the condenser casing and an attached head or extension (such as in Fig. 7), filling the condenser and head 46, the condenser and head being at approximately the same temperature, 110° C., as the sulfur. During the pouring, it is preferable that the condenser casing with its head be tilted so that the thick, mushy mass of sulfur will flow down one of the sides of the casing which is at right angles to the plane of the condenser plates. By thus filling the condenser, the sulfur gets in between the plates beginning approximately at a lower corner, forcing the air out from between the plates, as it gradually fills the casing. During this pouring operation, if so desired, the casing should be rapidly rapped, jarred or vibrated by some mechanical means such as the armature or hammer of an electric bell, to assist in the ebullition of air and to settle and compact the sulfur. The condenser should be filled with the sulfur in the condition above described preferably until not only the condenser casing and spaces between the plates are filled, but the head also. The condenser is then cooled in a gradual manner by cooling the bottom of the condenser casing and by applying jacket heat (at a temperature of 110° to 115°) to the upper part of the head. The method above described provides a condenser having, upon cooling and solidification of the sulfur, a very compact, uniform, stable, non-porous mass of sulfur between the plates forming a dielectric free from air and voids. If there is any shrinkage, it is in the head 46 (Fig. 7) and not in the body of the condenser. The sulfur formed by this process contracts very little and then only with a level drop. It has a strong mechanical texture and breaks with a glass-like fracture. It furthermore changes to a bright yellow color in a very few hours. The sulfur upon solidification apparently passes directly into the rhombic form without undergoing strain due to change of state.

If so desired, during the cooling of the sulfur in the condenser as above described, high electrical potential may be applied to the opposite plates. The potential should be of an order of the breakdown strength of the sulfur dielectric between the plates, of the order of 20,000 volts, and the application of potential should be continued until solidification. The object and effects of the application of potential were fully disclosed in the co-pending application Serial No. 465,079 above-mentioned, whereby a very close adherence between the armature plates 1 and the dielectric sulfur is secured.

Figure 6:
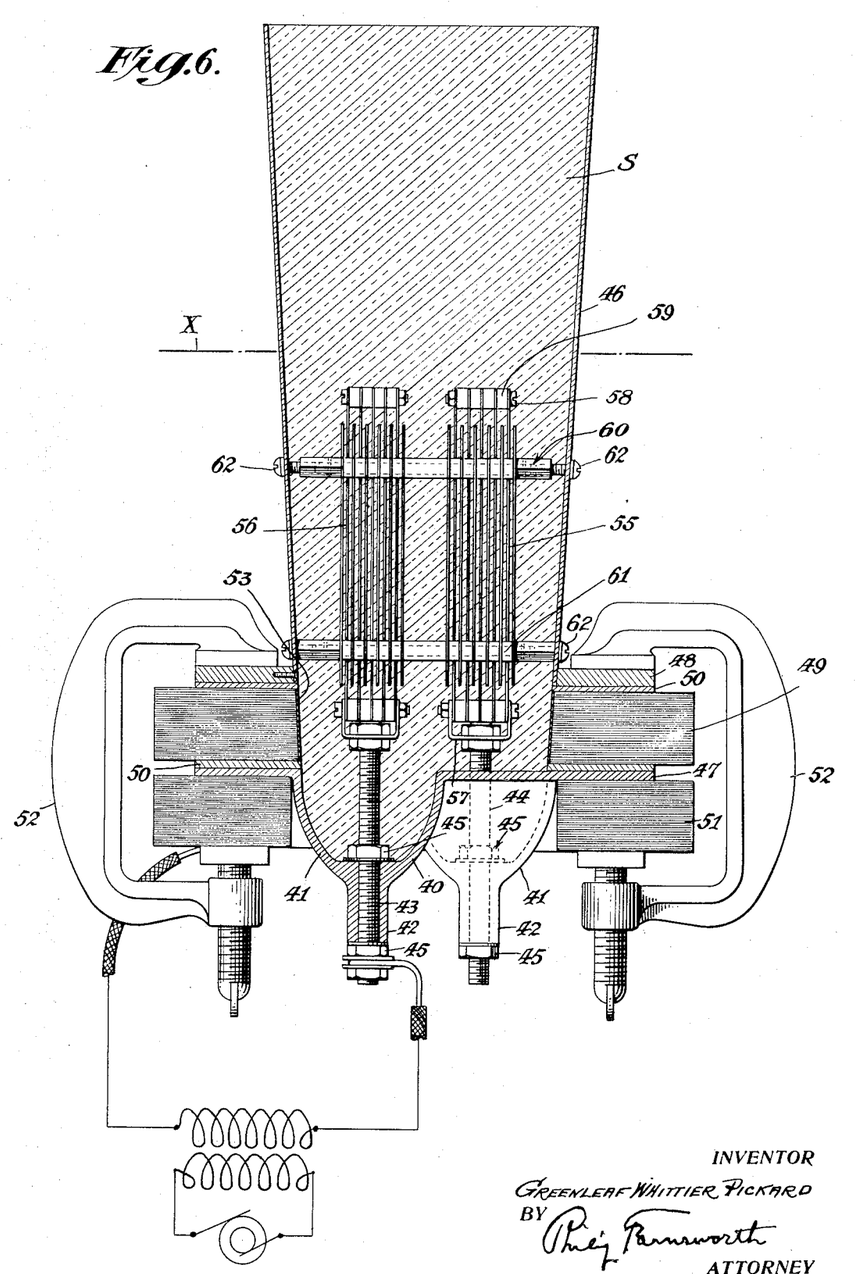
Fig. 6 is a sectional elevation of a modified form of condenser, illustrated in a special mold for embedding the condenser plates in sulfur.
Figure 7:
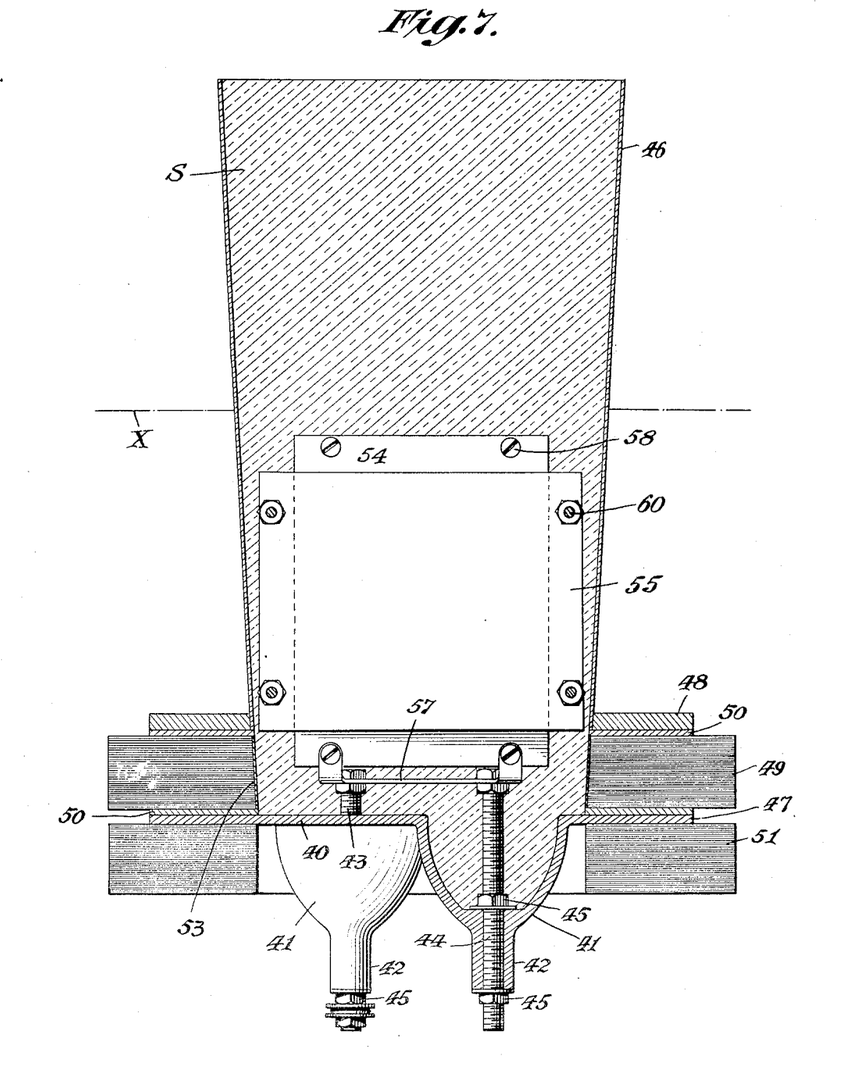
Fig. 7 is a sectional elevation of the arrangement of Fig. 6, taken at right angles to that of Fig. 6.

It is not necessary that the plates of the condenser be embedded while in their final or permanent casing. In Figs. 6 and 7 is illustrated a mold in which the plates may be placed, the sulfur then being placed between and around the same in the manner described, so as to form a casting which can be placed in a permanent casing such as 18 of Fig. 1.

The condenser plates of Figs. 6 and 7 differ from the arrangement illustrated in Figs. 1 to 5, the former comprising two groups of plates connected in series.

The mold comprises a metal bottom piece 40 having concavo-convex portions 41 terminating in tubular parts 42 in which the terminals 43—44 of the condenser may be secured by nuts 45 for supporting the plates during the embedding. A frustro-conical shaped head 46 co-operates with the piece 40 to form the mold. The parts 40—46 are provided with adjacent annular flanges 47—48. Between these flanges is placed an annular piece of insulation 49, gaskets 50, preferably of lead, being interposed between the ring 49 and the flanges 47—48 to prevent leakage, making a tight joint. Upon the opposite side of the flange 47 is placed an insulating ring or annular piece 51. A pair of C clamps 52 engaging the flange 48 and piece 51 tightly clamp the parts together.

The insulating rings 49—51 may consist of any suitable insulating material such as baked lava, suitably glazed. If so desired, a ring 53 of glazed paper may be interposed between the sulfur and ring 49 to prevent the sulfur from sticking to the ring.

The condenser plates 54 are rectangular in shape and are arranged in two groups 55—56, each group comprising plates of opposite polarity insulated from each other.

The plates of one polarity of group 55 are supported on the terminal rod 44 by means of the stirrups or angle piece 57, the plates being held together and in spaced relation by means of the bolts 58 and spacing washers 59. In similar manner, certain of the plates of group 56 are supported upon terminal rod 43. The opposing plates of groups 55—56 are supported from the mold part 46 by means of the bolts 60 (four in number) and spacing washers 61. By means of the screws 62 mounted in the part 46 and engaging opposite ends of the bolts 60, the spacing between the several plates may be adjusted. By rotating either or both terminals 43—44, the opposing plates can be made parallel. The plates of both groups supported by the mold 46 are at the same potential or electrically connected.

The condenser shown in Figs. 6 and 7 has been constructed to have a capacity of .0008 mfd. and to operate at 12,500 volts in a circuit carrying 16 amperes at high frequencies. The studs 43—44 form the terminals of the condenser which comprises two groups connected in series, one set of plates being common to the two groups and being electrically connected. The several plates are first assembled in a convenient manner and are then placed in the mold and adjusted to provide the necessary spacing and parallelism. Molten sulfur is then poured into the mold in the manner above described, the process being substantially identical with that described in connection with Figs. 1 to 5. In Fig. 6 is shown diagrammatically a circuit for applying potential to the sulfur during the process, the blocks 49—51 insulating the sets of plates from each other.

The piece 40 is constructed to allow the adjustment of the studs 43—44 to properly locate their plates relatively to the other group of plates supported by the mold part 46. It is also so shaped at 41 as to form a mold about the studs, the sulfur embedding the studs in a form to prevent leakage to the casing when the plates and sulfur embedment are inserted therein.

After the plates have been assembled in the mold, the assembly is heated to approximately 140° C. Sulfur or an equivalent dielectric material is then poured in, filling the mold to the top of the head as indicated at S in the figures.

After cooling, the C clamps and nuts 45 are removed. The part 40 is then removed, and then the part 46, these parts being heated slightly to melt the adjacent embedment where it sticks to the parts. The sulfur casting can then be cut off along the line $x$ (Figs. 6 and 7). The casting with the plates embedded therein can now be placed in the final casing and the condenser completed. Such a casing would include insulating shells of porcelain to protect the stud insulation formed in the parts 41 of the piece 40. Such a construction is shown and described in the co-pending application 468,799 above mentioned. Or the casing might be of the type illustrated in Figs. 1 to 5 of this application. The spaces left in the casing after the sulfur casting made by the mold is placed in the casing are filled up by molten sulfur. The floating plates may be additionally supported from opposite sides of the casing in the same manner in which these plates are supported from the mold 46 during the embedding as illustrated.

For some uses, it will not be necessary to place the condenser as made by the mold in a permanent casing. For instance, the sulfur around the studs 43—44 may be covered with an insulating varnish to protect it, and a metal may be deposited on the lower parts of the casting to likewise protect it.

While in Figs. 6 and 7 I have illustrated a mold which is not intended to form a permanent casing, yet it is also contemplated and intended that in some cases such a mold may form a permanent casing. In such cases, the piece 40 should comprise some suitable insulating material such as porcelain or glass instead of metal and will form a permanent top for the condenser. The part 46 should then taper in the opposite direction to allow its removal without disturbing the piece 40, or such part 46 can form a part of the permanent casing, a portion of it being removed along the line $x$ and a bottom being secured in place to enclose the embedment.

Again, (in anticipatory reference to the modifications of Figs. 8–13) if metal plates are dipped in molten sulfur (or an equivalent solution), with the sulfur at a temperature of between 118° C. and 145° C. and then removed, there will be a thin film of sulfur clinging to the plates, this film very quickly solidifying and crystallizing in the rhombic form. In order to secure the results of the present invention,—that is, the compact, non-porous mass of dielectric between the plates of the condenser,—instead of using paper or instead of simply using the process first above described, the several plates of the condenser before assembly in the casing may be dipped in molten sulfur at a temperature of around 130° C. This dipping may be repeated, after the sulfur has solidified each time, until a layer of sulfur is formed around each plate of such a thickness that the sulfur layers upon successive plates will about touch. After the plates have been assembled with their sulfur layers resulting from dipping adhering thereto, the condenser plates are assembled in the condenser casing or mold and the process as above described carried out, filling in the interstices and spaces remaining unfilled between the plates and around the sulfur already adhering to the plates. The sulfur which is poured in is of the thick, mushy character above described at a temperature below the melting or solidifying point of sulfur. It is not always necessary to dip the plates which are to form the armatures of the condenser with sulfur, but special plates for this purpose may be used for dipping. In this case, after the special plates have been covered with the dipped layer or layers of sufficient thickness, the soft sulfur on the edges of the plates is trimmed off, and then the remaining sulfur on the sides of the plate after setting and hardening is pried from the metal plate, forming well-defined layers or plates of sulfur of the rhombic character, which may have approximately any required or desired thickness, the sulfur changing from a yellowish brown to a light yellow color. These sulfur plates may be assembled with armatures to form a condenser or can be placed between the plates of the condenser, and the spaces between the metal plates and the sulfur plates filled up with molten sulfur, whereby upon solidification all the sulfur forms a compact, solid, non-porous embedment between and around the condenser plates, forming a sulfur dielectric having good dielectric properties. The nature of the sulfur which is poured in to fill the condenser casing and the remaining spaces is as above described; that is, sulfur which has been heated for some time, maintained in a viscous condition, and with which powdered sulfur has been mixed until it forms a mushy mass at a temperature below the normal solidification or melting point of the sulfur. The texture of the sulfur obtained by dipping metal sheets into a molen mass of sulfur and allowing the adhering sulfur to solidify is very fine.

This dipping process may also be utilized in the manufacture of condensers other than those of the type herein described. For instance, if a metal plate is dipped successively in the sulfur, successive coatings of sulfur will be deposited thereon. With an aluminum plate of approximately 35 mils in thickness and a sulfur bath approximating 135° C., I have found the first layer to be approximately 10 mils thick. The sulfur appears to cool and solidify with its crystal axis parallel to the surface of the metal plate. Upon the first dipping, microscopic depressions will be formed on the surface of the sulfur. On the second dipping, these depressions will be smaller, until upon successive dippings they entirely disappear. The material formed on the plate adheres very firmly thereto and has a hard texture. With plates of a given thickness and a bath of a given temperature and a given speed of dipping, the deposit or thickness of the sulfur deposited on the plate can be controlled and duplicated. Such coated plates may be assembled with metal armatures to form a condenser, the interstices between the sulfur plates and armatures being filled with sulfur in the manner above described.

Another method of making a condenser is substantially as follows. A metal element which is to constitute one armature of the condenser is coated by dipping in molten sulfur as above described. The sulfur deposited upon the metal element is then electroplated with a metal, the metal-deposited surface forming the other metal element. Or, if so desired, a metal paint may be brushed on the sulfur or secured thereon by dipping, or the sulfur may be covered with or dipped into a molten alloy having a melting point below that of the sulfur and maintained at a temperature below that of the melting point of the sulfur. The armatures are then assembled in a casing and embedded with sulfur.

The following method is especially adapted for use where a fairly heavy coating is required. In such method, the sulfur coatings may be applied in layers by interposing insulating varnish dipping operations between the sulfur dipping operations and producing a structure in which the layers are separated from one another by flexible and very thin bindings of insulating adhesive or varnish. I find that when such a structure is prepared, there is less liability of cracks developing, and furthermore that when cracks do develop they do not penetrate through the complete coating but tend to stop at a varnished surface. Such a condenser may be made by dipping the metal armatures in a bath of liquid varnish or adhesive, and then dipping the same in a bath of sulfur, and alternating the dipping in varnish and sulfur until the sheets of dielectric of the required thickness are obtained, allowing the sulfur coating to cool each time. The outer surface can then be coated with graphite and metal deposit by electrolysis made on this. Or metal may be chemically deposited upon the sulfur, and this metal electroplated with a heavier metal in perfect intimate contact. The outer element may be a bath of mercury. A pair of such plates may be cemented together with a space between them, and this space filled with mercury to form the inner plate.

In Figs. 8 to 13 is illustrated a "dipped plate" type of condenser in which the opposing armature comprises a mercury or a low melting point alloy.

Figure 8:
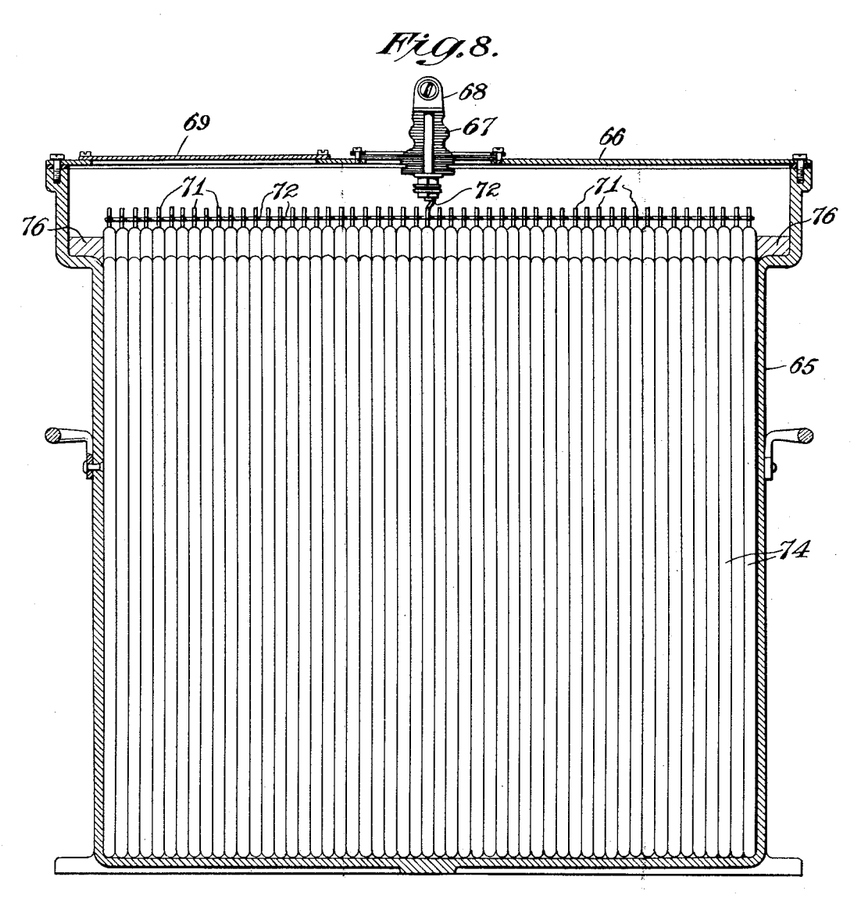
Fig. 8 is an elevation of a modified type of condenser, the casing being in section.
Figure 9:
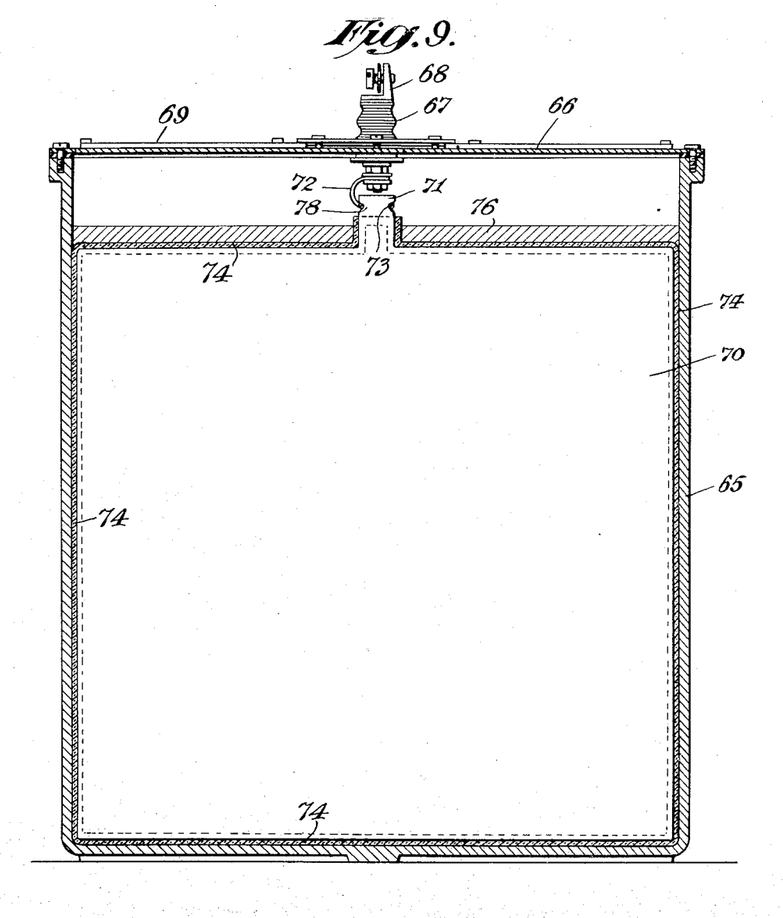
Fig. 9 is a sectional view of the same on the line 9—9 of Fig. 12, looking in the direction of the arrows.

The condenser comprises a metal casing or box 65 having a metal cover 66 which is placed in position after the dipped plates are arranged in the box. On the cover is the insulating bushing 67 and high potential terminal 68. The cover has a removable piece 69 to permit access to the interior of the box.

Figures 10, 11:
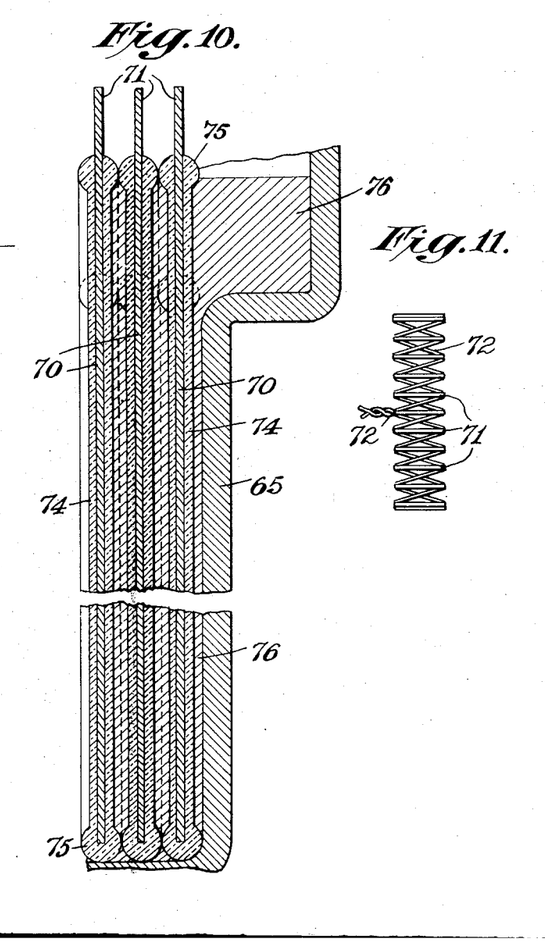
Fig. 10 is an enlarged sectional detail view of the plates of this condenser.
Fig. 11 is a detail plan view, illustrating how the several plates are connected together.
Figure 12:
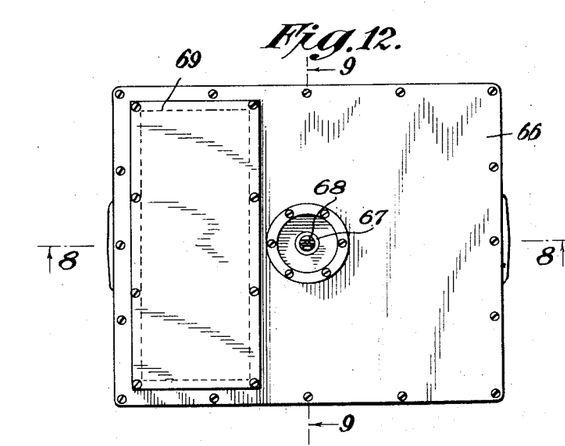
Fig. 12 is a plan view of the condenser casing.
Figure 13:
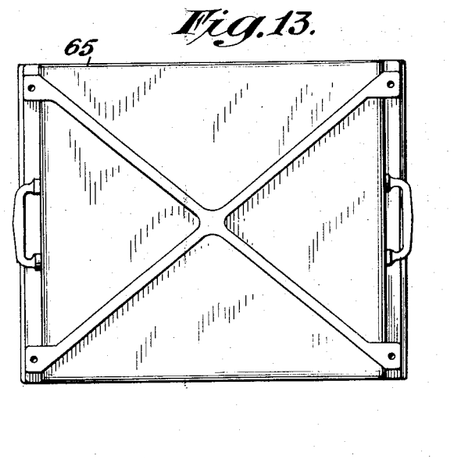
Fig. 13 is a bottom plan view of the casing.

The metal plates 70 have projecting tabs or terminals 71 (Fig. 9) arranged in alinement at the edge adjacent the terminal 68. A wire 72 (Figs. 9 and 11) is wound back and forth connecting the several terminals or tabs 71, the latter being reduced at 73 to hold the wire in place. The ends of the wire 72 are electrically connected to the terminal 68 (Fig. 11). This arrangement provides means for easily and quickly connecting all the tabs 71 to the terminal 68.

The plates 70 are dipped in sulfur in the manner above described, forming coatings 74 of sulfur on the faces and edges 75, such coatings bulging at the edges (shown exaggerated in Fig. 10). When the several coated sheets are arranged in parallelism within the casing 65 as illustrated, a low melting point fusible metal or mercury 76 is poured into the casing, filling the spaces between the plates 70 forming the armatures of polarity opposite to 70. The level of the armature 76 should be below the coatings 74 so as not to short-circuit the condenser. For this purpose, the level of the metal 76 may be even lower than shown in the drawings, Figs. 8–10.

Sulfur for use as a dielectric or insulator may also be used in combination with other substances having good insulating properties, providing sulfur cements.

In the study of the phase angle of sulfur when used as a dielectric, I found that the rhombic form immediately after casting had a comparatively low phase angle of the order of one minute. Approximately twenty-four hours after cooling, the phase angle rose to around twenty minutes. To prevent the rise of phase angle with time and to maintain the phase angle of the sulfur at its initial low figure, or substantially so, I surround the freshly-cast sulfur with paraffin oil, or other low loss insulating oil. By maintaining the sulfur under warm oil at least for a period until the sulfur has thoroughly set or settled and allowing the oil to thoroughly permeate any cracks or spaces, the phase angle can be maintained at a low figure. After the casting has settled or set, the oil can be removed and the casting dipped in or covered by molten, high melting point, oil-proof, moisture-proof wax, forming a hard sheath on cooling. The condensers made as above described are to be treated by this oil method where it is desirable to maintain a small phase angle.

For some purposes, the condenser disclosed in the drawings of this application may be filled through the bottom in the manner described in the co-pending applications above-mentioned, the condenser casing and head being maintained at a temperature of about 140° C., by pouring sulfur at the same temperature therein, this sulfur being previously pre-cooked for a considerable length of time to drive off air and gases, and a potential of approximately 20,000 volts (of the order of the breakdown strength of the sulfur) being applied across the plates during the cooling, the latter taking place from the bottom upwardly. This cooling takes place in approximately two hours.

Whatever the process employed, the head (46, Figs. 6—7) is removed and the surplus sulfur broken off at a point outside of the casing, and then the sulfur mass is evened up flush with the casing, to allow the application of the casing bottom 19 (Fig. 1), by means of a hot plate placed either directly on top of the sulfur or on the top of the bottom plate 19.

I have found that the metals or other materials used in condensers or receptacles where sulfur is being treated should be of such a nature as are not corroded or affected by sulfur. Such materials are enumerated in the co-pending applications above-mentioned, among them being aluminum, mercury or similar non-corrosive material.

The sulfur product formed by the above processes or methods in connection with heat treatment as hereinafter described and used as insulators or in connection with the condensers of this invention such as disclosed, in which sulfur is used either as a combined dielectric and filler, or in the sheet form of active condenser dielectric, or simply as a filler, is characterized by non-friability, toughness, non-porosity, cohesion in its mass, freedom from internal strains, and its great compactness compared to commercial sulfur. The sulfur of the present invention, whether used as a combination filler and dielectric or generally as an insulator, or simply as an insulating filler, or simply as an active dielectric of a condenser, is free from cracks, voids and internal strains which cause the well-known brittleness and breakdown.

The degree of compactness of the sulfur product of the above processes is such that its density is greater than the density of the commercial sulfur, roll form, which has a specific gravity of 1.92, the special sulfur of this invention having approximately a specific gravity of a rhombic crystal of sulfur which is 2.07. This compactness is substantially uniform, the material itself, whether used as a combination filler and dielectric or as a filler, having a uniform consistency or appearance, being free from voids and cracks and being homogeneous; that is, holosteric. The comparative compactness and porosity of the sulfur of this invention and commercial sulfur may be determined by applying a mixture of red ink or other coloring matter and wood alcohol or other solvent to each. The colored mixture permeates the common form, being rapidly absorbed into the mass of the material by capillary attraction. In the product of this invention, no appreciable penetration occurs. The processes or methods employed in the present invention not only provide a form of sulfur having the characteristics above described which distinguish it from the commercial form, but also place and maintain the sulfur in dielectric intimate contact with the condenser armatures without separating therefrom upon cooling.

It is within the scope of the present invention to incorporate or mix with sulfur as a dielectric or insulator other materials in order to enhance its value as a practical insulator or dielectric in condenser manufacture, such as small amounts of paraffin, iodine or other low melting point dielectric or the non-fusible material above described.

The present invention provides a compact, cheap condenser for general usage but especially adapted for low capacity and high voltage work and in which the sulfur is used as a dielectric, filler, or combination filler and dielectric. Sulfur when treated by the processes herein described is superior to wax for a filler or dielectric, or both, because of its higher dielectric constant and lower loss compared with wax at higher temperatures and because sulfur withstands temperatures of a relatively higher order and where brushing occurs does not undergo chemical change. Wax, on the other hand, carbonizes and releases water at higher temperatures. Another property of sulfur is its ability to withstand breakdown without any change whatever and its apparent greater thermo-conductivity as compared with waxes.

Before the above-described processes or methods are performed, the sulfur used therein is preferably previously prepared by melting the roll sulfur of commerce and heating the molten sulfur for a period of several hours at a temperature to maintain it in a molten condition (either viscid or liquid, or both). This long heat treatment causes a change in the commercial sulfur, which may be due to the removal of gases or water, or other entrapped volatile substances in the commercial sulfur, and produces a cast which is compact, hard and cohesive, as contrasted with the cast prepared by simply bringing commercial roll sulfur up to the molten condition and then, without prolonged heating, allowing it to cool. The time required to produce the sulfur with the above properties will vary directly with the temperature at which it is heated. For instance, I have obtained very good results by heating the sulfur for five hours while maintaining the temperature at about 185° C., and very good results by maintaining a temperature of 170° C. for about ten hours. At temperatures above 185° C., the sulfur tends to catch on fire. Roll sulfur that has been simply heated for a short time and then immediately allowed to cool, produces a cast which generally is a loose crystalline mass having a very small cohesion in its body. All the sulfur used in the herein-described processes or methods should preferably be heat-treated prior to its use as an insulator or a condenser dielectric or filter material, or both.

It is to be understood that the invention is not limited to the embodiments and features specifically shown and described herein, but that such embodiments and features are subject to changes and modifications without any departure from the spirit of the invention.

The sulphur in this condenser may have quartz mixed in with it in either coarse or pulverized form, in about the amounts of 75 per cent. quartz and 25 per cent. sulphur.

I claim:—

1. In an electrical condenser, a metal casing having an insulating cover, a set of stiff metal armature plates of one polarity supported from said cover and provided with a terminal projecting through the cover, a set of stiff metal armature plates of the opposite polarity being arranged alternately with the plates of said first set and supported from the sides of the metal casing and in electrical connection therewith, the casing thereby constituting the other condenser terminal; all of said armature plates being spaced from one another; and an embedment of compact, non-porous dielectric material interposed between said plates constituting the active condenser dielectric and also filling said casing between the condenser and the inner wall of the casing.

2. In an electrical condenser, a metal casing having an opening provided with an insulating cover, a plurality of stiff metal armature plates mounted in said casing, each having along one edge thereof a recess and a pair of holes upon opposite sides of the recess, and having upon the opposite edge thereof a pair of recesses and a central hole, said plates being arranged successively alternately and reversely as plates of opposite polarity, two metal cross-members extending thru said holes and securing the plates of like polarity together, said recesses being arranged to insulate the plates of each polarity from the plates and cross-members of the other polarity; means connected to one of said cross-members of the plates of one polarity for supporting said set of plates from said insulating cover and constituting a terminal, threaded members engaging the cross-members of the plates of opposite polarity and extending thru said casing whereby the plates are supported from the sides of the casing and electrically connected thereto, and a compact, non-porous mass of dielectric material interposed between each pair of all said plates and also filling said casing between the inner wall thereof and the condenser.

3. A condenser including two independently mounted sets of armature plates, the individual plates of the two sets being interleaved; means for each set spacing the plates thereof from one another; means for rotating one set in its mounting during manufacture and before application of the condenser dielectric to bring its spaced plates into parallelism with the spaced plates of the other set; and means for moving one set bodily on its mounting during manufacture to bring its spaced-apart plates into desired spacial relation with the spaced-apart plates of the other set; and a solid mass of uniformly dense, stable, strong material of high dielectric strength surrounding said two plate-sets as a whole, filling the spaces between the individual adjacent plates of the two sets thereby constituting the condenser-dielectric, said solid mass permanently maintaining the plates in the spaced relation in which they were placed prior to the combination of said solid mass with them.

4. A condenser including two sets of armature plates, the individual plates of the two sets being interleaved with one another; an enclosing casing including conducting and insulating portions, one set of plates being supported by said insulating casing portion, with the individual plates of the set spaced from the individual plates of the second set; the second set being supported by said conducting casing portion, said insulating casing portion insulating the individual plates of one set from those of the other set; and a solid mass of a uniformly dense, stable, strong material of high dielectric strength surrounding said plate-sets as a whole, filling the spaces between the individual adjacent plates of the two sets thereby constituting the condenser dielectric, and permanently maintaining the spaced relation of the plates initiated by said plate supporting means.

5. A condenser including two sets of armature plates of which the individual plates of one set are interleaved with those of the other, a metal casing in which said plates are supported, the plates of each set being electrically connected together in the set and the plates of one set being insulated and spaced from the plates of the other set; the casing being formed with a large and a small opening respectively in opposite faces, the smaller opening being of smaller diameter than the plate-assembly and the larger opening being larger than the plate assembly; a terminal of one plate set extending thru said smaller opening and insulated from the casing, the other plate set being electrically connected with the metal casing as a terminal; the spaced plates extending in line between said openings; and a solid mass of a uniformly dense, stable and strong material of high dielectric strength filling the casing around the plate assembly and filling the spaces between the adjacent plates thereby constituting the condenser dielectric, said mass also permanently maintaining the spacing between the armature plates.

6. A condenser including two sets of armature plates each set consisting of a comparatively small number of plates for low capacity service, the individual plates of the two sets being interleaved; metallic mounting means for each set and having connections with the edges of the plates of the set thereby determining the spacing of the plates to each set; plate-encasing means spaced from said plates but supporting said two metallic mounting means in cooperative relation, with the several plates of each set in spaced relation with the several interleaved plates of the other set, said encasing means including a member of insulating material insulating said two metallic mounting means from one another thereby insulating the interleaved spaced plates of the two sets from one another; and a stable mechanically strong insulating material of high dielectric strength normally solid but liquefiable at moderately high temperature and cast in place inside the encasing means and in the space between the plate-encasing means and the plates and in the spaces interconnecting with said space and lying between the interleaved plates themselves forming a unitary solid constituting both an embedment surrounding the interleaved plates as a whole and constituting the condenser dielectric of high dielectric strength between the various spaced interleaved armature-plates said unitary solid adjoining the two faces of each of the several plates of each set thereby cooperating with the edge-connections of said metallic mountings and with the encasing means both of which determine the cooperative spacing of the plates of the two sets, in maintaining the desired spaced relations of the condenser plates.

7. An electrical apparatus comprising one or more members housed within said casing and spaced therefrom, said spaces being subject to electric potential stresses produced by said member or members, there being pulverized piezo-electric material disposed in said spaces, whereby said members are insulated from the casing and one another.

8. An electrical apparatus comprising a casing, one or more members to be insulated from the casing and each other, housed within said casing, the spaces between said casing and member or members, being subject to electric potential stresses, said spaces being filled with a pulverized piezo-electric substance having high thermal conductivity.

9. In an electrical apparatus, as defined in claim 8, said pulverized substance including quartz.

GREENLEAF WHITTIER PICKARD.